(12) United States Patent
Liao et al.

(10) Patent No.: US 10,384,111 B2
(45) Date of Patent: Aug. 20, 2019

(54) BICYCLE TRAINER

(71) Applicant: Shu-Chiung Liao Lai, Taichung (TW)

(72) Inventors: Chia-Sheng Liao, Taichung (TW); Yao-Ting Lee, Taichung (TW)

(73) Assignee: Shu-Chiung Liao Lai, Taichung (TW)

( * ) Notice: Subject to any disclaimer, the term of this patent is extended or adjusted under 35 U.S.C. 154(b) by 155 days.

(21) Appl. No.: 15/806,549

(22) Filed: Nov. 8, 2017

(65) Prior Publication Data

US 2019/0134480 A1 May 9, 2019

(51) Int. Cl.
| | |
|---|---|
| *A63B 69/16* | (2006.01) |
| *A63B 24/00* | (2006.01) |
| *A63B 22/00* | (2006.01) |
| *A63B 21/00* | (2006.01) |
| *A63B 21/22* | (2006.01) |
| *A63B 71/06* | (2006.01) |
| *H02J 7/14* | (2006.01) |
| *H04Q 9/02* | (2006.01) |

(52) U.S. Cl.
CPC ........ *A63B 69/16* (2013.01); *A63B 21/00192* (2013.01); *A63B 21/225* (2013.01); *A63B 22/0023* (2013.01); *A63B 24/0087* (2013.01); *A63B 71/0622* (2013.01); *H02J 7/1407* (2013.01); *H04Q 9/02* (2013.01); *A63B 2069/162* (2013.01); *A63B 2069/164* (2013.01); *A63B 2071/0638* (2013.01); *A63B 2225/50* (2013.01); *H04Q 2209/43* (2013.01)

(58) Field of Classification Search
CPC . A63B 69/16; A63B 24/0087; A63B 22/0023; A63B 71/0622; A63B 21/225; A63B 21/00192; A63B 2069/164; A63B 2069/162; A63B 2071/0638; A63B 2225/50; A63B 22/06; A63B 22/0605; A63B 23/0476; A63B 2069/161–168; H04Q 9/02; H04Q 2209/43; H02J 7/1407
See application file for complete search history.

(56) References Cited

U.S. PATENT DOCUMENTS

| | | | | |
|---|---|---|---|---|
| 2,972,478 | A * | 2/1961 | Raines | A63B 69/16 211/22 |
| 4,817,939 | A * | 4/1989 | Augspurger | A63B 22/16 482/2 |
| 4,955,600 | A * | 9/1990 | Hoffenberg | A63B 21/015 434/61 |
| RE34,479 | E * | 12/1993 | Minoura | A63B 21/0051 482/6 |
| 5,382,208 | A * | 1/1995 | Hu | A63B 21/0051 482/61 |

(Continued)

*Primary Examiner* — Andrew S Lo
(74) *Attorney, Agent, or Firm* — C. G. Mersereau; DeWitt LLP

(57) ABSTRACT

A bicycle trainer includes a magnetic control damping device controlling a resisting force of a roller set to simulate stamp strengths required by a bicycle on various roads. A lifting device controls a support frame and a base seat to drive a front fork of the bicycle up or down to dynamically simulate states of the body of the bicycle on various roads, so that the actual effect closest to the bicycle running on an uphill, smooth or bumpy road can be achieved. In addition, a power generation device converts the rotating power, generated by the roller set, into the electric power for the dynamic simulation or other electronic devices.

14 Claims, 6 Drawing Sheets

(56) References Cited

U.S. PATENT DOCUMENTS

| | | | | |
|---|---|---|---|---|
| 5,916,067 A * | 6/1999 | Morasse | A63B 69/16 | 482/61 |
| 6,450,922 B1 * | 9/2002 | Henderson | A63B 24/0006 | 482/8 |
| 6,712,737 B1 * | 3/2004 | Nusbaum | A63B 69/16 | 482/57 |
| 7,083,551 B1 * | 8/2006 | Lassanske | A63B 69/16 | 211/22 |
| 7,226,395 B2 * | 6/2007 | Wu | A63B 69/16 | 280/293 |
| 9,433,820 B1 * | 9/2016 | Martinez | A63B 69/16 | |
| 9,802,099 B2 * | 10/2017 | Hamilton | A63B 24/0087 | |
| 2003/0073546 A1 * | 4/2003 | Lassanske | A63B 21/0053 | 482/63 |
| 2005/0209064 A1 * | 9/2005 | Peterson | A63B 22/16 | 482/61 |
| 2006/0229163 A1 * | 10/2006 | Waters | G16H 20/30 | 482/8 |
| 2007/0004565 A1 * | 1/2007 | Gebhardt | A63B 69/16 | 482/61 |
| 2007/0219054 A1 * | 9/2007 | Papadopoulos | A63B 22/02 | 482/6 |
| 2010/0062908 A1 * | 3/2010 | Hamilton | A63B 24/0087 | 482/61 |
| 2010/0062909 A1 * | 3/2010 | Hamilton | A63B 24/0087 | 482/61 |
| 2010/0234188 A1 * | 9/2010 | Wan | A63B 69/16 | 482/61 |
| 2010/0298103 A1 * | 11/2010 | Hamilton | A63B 24/0087 | 482/63 |
| 2011/0218080 A1 * | 9/2011 | Papadopoulos | A63B 69/16 | 482/61 |
| 2011/0275488 A1 * | 11/2011 | Hamilton | A63B 24/0087 | 482/61 |
| 2011/0287901 A1 * | 11/2011 | Wan | A63B 69/16 | 482/57 |
| 2012/0238412 A1 * | 9/2012 | Hamilton | A63B 24/0087 | 482/61 |
| 2015/0011364 A1 * | 1/2015 | Kimura | A63B 69/16 | 482/57 |
| 2015/0051718 A1 * | 2/2015 | Inoue | A61B 5/1127 | 700/91 |
| 2015/0133272 A1 * | 5/2015 | Papadopolous | A63B 69/16 | 482/61 |
| 2015/0217158 A1 * | 8/2015 | Colan | A63B 22/0605 | 482/61 |
| 2016/0067580 A1 * | 3/2016 | Viera | A63B 69/16 | 482/61 |
| 2016/0236055 A1 * | 8/2016 | Kalogiros | A63B 69/16 | |
| 2016/0250541 A1 * | 9/2016 | Papadopoulos | A63B 69/16 | 482/61 |
| 2017/0072254 A1 * | 3/2017 | Ryu | A63B 24/0087 | |
| 2017/0128764 A1 * | 5/2017 | Hsu | A63B 69/16 | |
| 2017/0216678 A1 * | 8/2017 | Smits | A63B 21/4034 | |
| 2018/0036619 A1 * | 2/2018 | Kim | A63B 69/16 | |
| 2018/0339211 A1 * | 11/2018 | Coberly | A63B 69/16 | |
| 2018/0369675 A1 * | 12/2018 | Papadopoulos | A63B 69/16 | |
| 2019/0070476 A1 * | 3/2019 | Bass | A63B 21/005 | |
| 2019/0118058 A1 * | 4/2019 | Bass | A63B 21/005 | |

* cited by examiner

BICYCLE TRAINER

BACKGROUND OF THE INVENTION

(1) Field of the Invention

The present invention relates to a technical field of a structure of a bicycle trainer, and more particularly to a bicycle trainer capable of dynamically simulating a state when a bicycle runs on an uphill, smooth or bumpy road, and converting the rotating power, generated upon training, into the electric power for the dynamic simulation.

(2) Description of the Prior Art

Generally, a conventional common bicycle trainer holds a body of a bicycle with a rear wheel of the bicycle contacting a damping wheel. When a user stamps to drive the rear wheel to rotate, the damping wheel generates an appropriate resisting force through an oil resistance device, a mechanical device or a magnetic control device to increase the stamp strength of rotating the rear wheel and thus to achieve the training objective.

However, when the conventional trainer is being used, the body of the bicycle is held stationary, and only the resisting force of the damping wheel can be used to statically simulate the stamp strengths of the bicycle running on the smooth and uphill roads, and the state of the body when the bicycle runs on the uphill, smooth or bumpy road cannot be dynamically simulated. Thus, the actual requirement of the rider riding the bicycle cannot be sufficiently reacted, and the training effect is affected.

SUMMARY OF THE INVENTION

A main objective of the present invention is to solve the problems that the conventional bicycle trainer only can statically simulate the stamp strengths of the bicycle running on the smooth and uphill roads, but cannot dynamically simulate the state of the body when the bicycle runs on the uphill, smooth or bumpy road, and that the actual requirement of the rider riding the bicycle cannot be sufficiently reacted.

The present invention provides a bicycle trainer including a base seat, a support frame, a roller set, a magnetic control damping device, a power generation device, a lifting device, a rechargeable battery and a controller. The base seat includes a base and a front fork holder disposed on a front end of the base seat, and the front fork holder has a fixing rod with a top end portion onto which a front fork of a bicycle is mounted. The support frame has one end swingably combined with a front end of the base, and the other end having a plurality of rollers. The roller set includes a front roller and a rear roller parallelly and separately disposed on the base. The rear wheel of the bicycle may rest against top sides of the front and rear rollers. The magnetic control damping device disposed on the base generates a magnetic drag force to control a damping effect of the rear roller. The power generation device disposed in the rear roller can convert the rotating power of the rear roller into the electric power. The lifting device is connected to the front fork holder and the support frame, and controls the support frame to drive the front end of the base seat up or down. The rechargeable battery stores and supplies the electric power. The controller connected to the rechargeable battery, the lifting device, the power generation device and the magnetic control damping device can directly supply the electric power, generated by the power generation device, to the lifting device and the magnetic control damping device, store the excess electric power into the rechargeable battery, control a magnitude of the magnetic drag force generated by the magnetic control damping device, and control the lifting device to drive the support frame to move the front end of the base seat up or down by a height.

In the bicycle trainer of the present invention, the magnetic control damping device controls the rear roller to generate the resisting force to simulate the stamp strengths required by the bicycle on the uphill, smooth or other roads, and then the lifting device controls the support frame to drive the front end of the base seat up or down to dynamically simulate the state of the body of the bicycle running on the uphill, smooth or bumpy road. Thus, the objective of dynamically simulating the actual state of the bicycle running on the uphill, smooth or bumpy road can be achieved, and the actual requirement of the bicycle rider can be satisfied to enhance the training effectiveness. More particularly, the power generation device converts the rotating power, generated upon training, into the electric power for the dynamic simulation or other electronic devices, so that the effective energy saving effect can be achieved.

Further aspects, objects, and desirable features of the invention will be better understood from the detailed description and drawings that follow in which various embodiments of the disclosed invention are illustrated by way of examples.

DETAILED DESCRIPTION OF THE PREFERRED EMBODIMENTS

Figure 1:
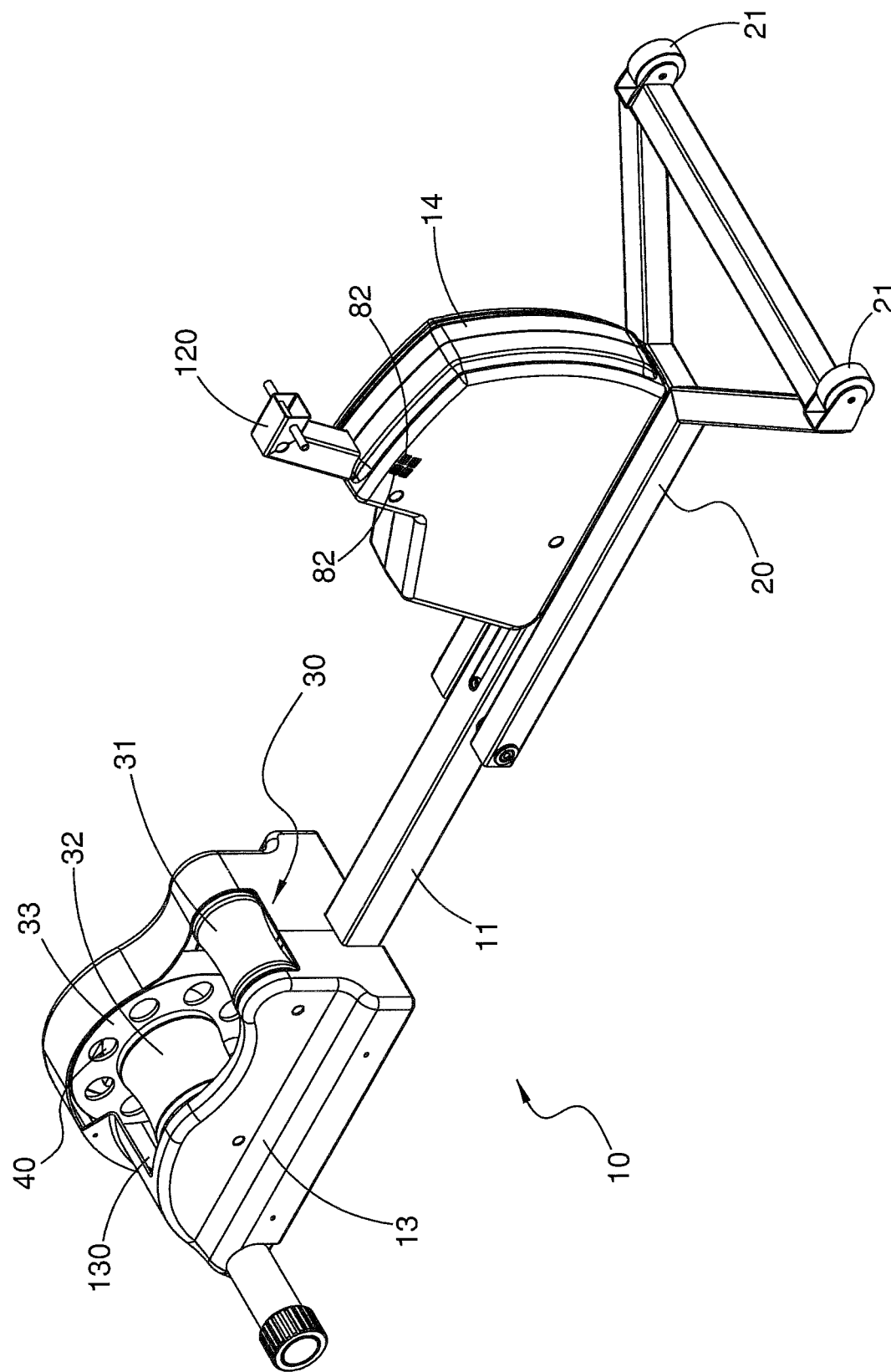
FIG. 1 is a pictorial outlook view showing the present invention.

Referring to FIGS. 1 to 6, a bicycle trainer of the present invention includes a base seat 10, a support frame 20, a roller set 30, a magnetic control damping device 40, a power generation device 50, a lifting device 60, a rechargeable battery 70, a controller 80, a display device 90 and an operation device 91.

The base seat 10 includes a base 11, a front fork holder 12, a rear housing 13 and a front housing 14. The front fork holder 12 is retractably combined with a front end of the base 11, and has a fixing rod 120 with a top end portion onto which a front fork A1 of a bicycle A is mounted. The rear housing 13 is disposed on a rear portion of the base 11, and has an upward opening 130. The front housing 14 is disposed on the front fork holder 12, and the top end portion of the fixing rod 120 extends out of the front housing 14.

The support frame 20 has one end swingably combined with the front end of the base 11, and the other end having rollers 21, which contact the ground and can freely rotate.

The roller set 30 includes a front roller 31 and a rear roller 32 parallelly and separately disposed on the base 11. The front roller 31 and the rear roller 32 are covered by the rear housing 13, and top sides of the front and rear rollers 31 and 32 are exposed from the opening 130 of the rear housing 13, and a rear wheel A2 of the bicycle A rests against the top sides of the front and rear rollers 31 and 32. One end of the rear roller 32 is combined with a flywheel 33 with a larger outer diameter, and the flywheel 33 is covered by the rear housing 13.

The magnetic control damping device 40 is disposed on the base 11 and one side of the flywheel 33, is covered by the rear housing 13, and generates a magnetic drag force to control the rear roller 32 to generate the appropriate damping effect to simulate the stamp strength of the bicycle A required when running on an uphill or smooth road.

The power generation device 50 is disposed in the rear roller 32 and converts the rotating power of the rear roller 32 into the electric power.

The lifting device 60 is connected to the front fork holder 12 and the support frame 20 and covered by and disposed inside the front housing 14, and can control the support frame 20 to drive the front end of the base seat 10 up or down to dynamically simulate a state of a body A3 of the bicycle A running on the uphill, smooth or bumpy road.

The rechargeable battery 70 is disposed on the front fork holder 12 and covered by and disposed inside the front housing 14, and stores and supplies the electric power.

The controller 80 is disposed on the front fork holder 12 and covered by and disposed inside the front housing 14. The controller 80 is connected to the rechargeable battery 70, the lifting device 60, the power generation device 50 and the magnetic control damping device 40, and directly supplies the electric power, generated by the power generation device 50, to the lifting device 60 and the magnetic control damping device 40, stores the excess electric power into the rechargeable battery 70, controls a magnitude of the magnetic drag force generated by the magnetic control damping device 40, and controls the lifting device 60 to drive the support frame 20 to move the front end of the base seat 10 up or down by a height.

The display device 90 is connected to the controller 80 in a wired or wireless manner, and displays images when the bicycle runs on various roads. Different signals are generated and transmitted to the controller 80 according to the images, so that the controller 80 can control the lifting device 60 and the magnetic control damping device 40 in correspondence with various images to dynamically simulate the situations when the bicycle runs on various roads according to the images displayed on the display device 90. For example, when the display device 90 displays the uphill image, the controller 80 controls the magnetic control damping device 40 to generate the larger magnetic drag force and controls the lifting device 60 to drive the support frame 20 to move the front end of the base seat 10 up. In the present invention, the display device 90 may be a mobile phone or a tablet computer mounted on the bicycle A, or may be a monitor mounted on the wall or supported on the ground.

The operation device 91 is connected to the controller 80 in a wired or wireless manner to manually control the magnetic control damping device 40 and the lifting device 60 through the controller 80. In the present invention, the operation device 91 may be a wireless remote controller, a wired operator or the like.

Figure 2:
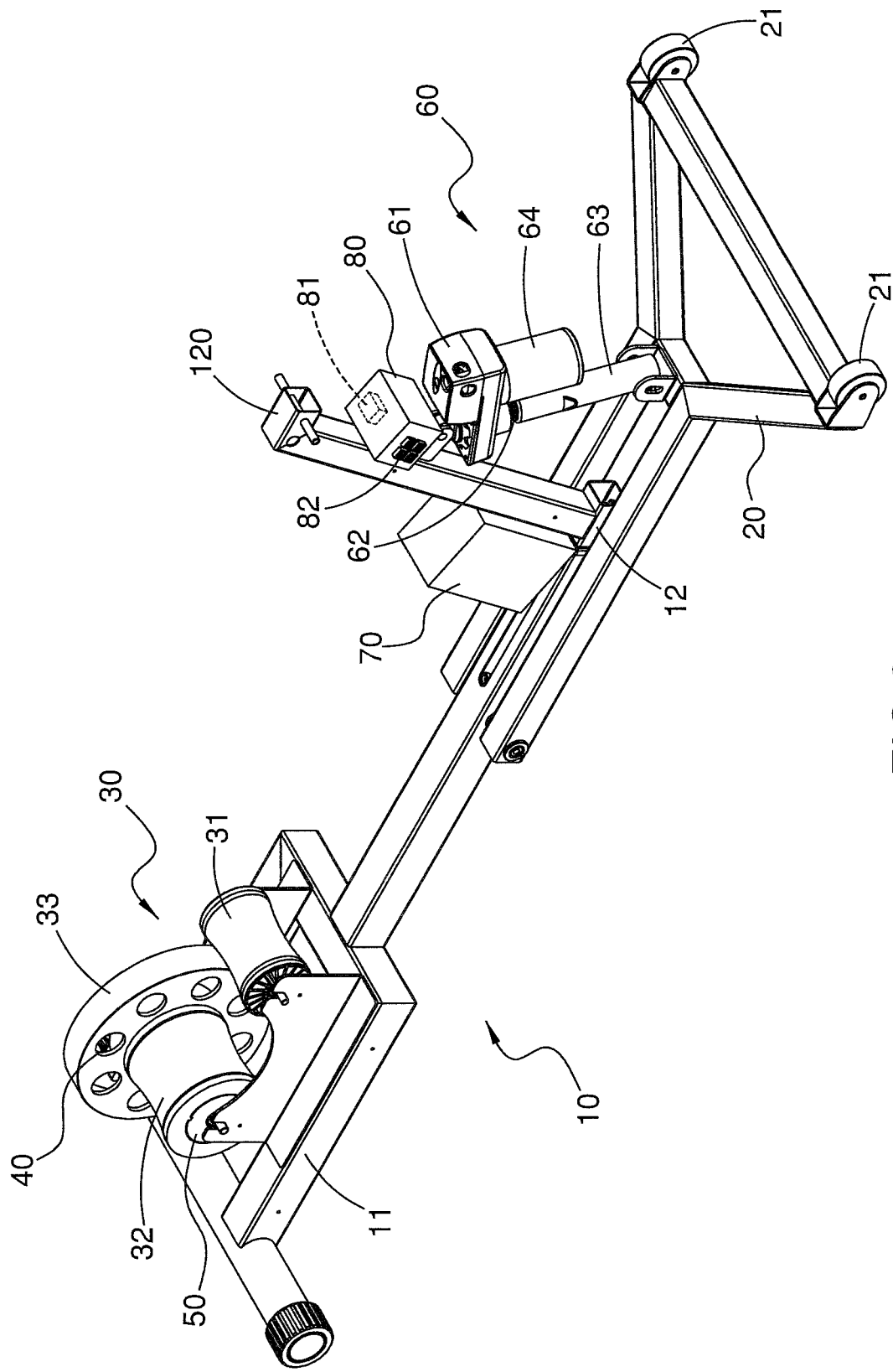
FIG. 2 is a pictorial view showing an inner structure of the present invention.
Figure 3:
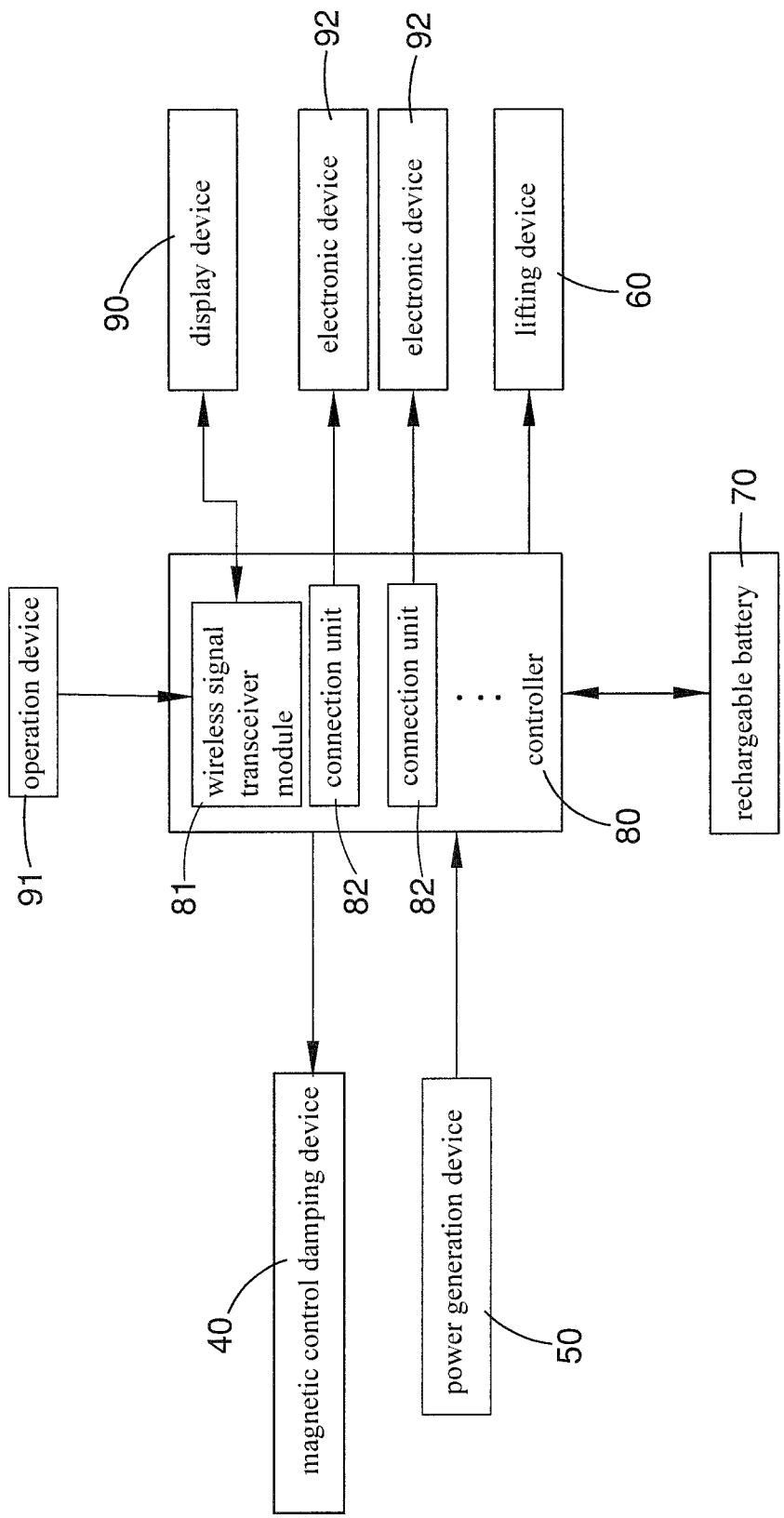
FIG. 3 is a schematic block diagram showing a control system of the present invention.
Figure 4:
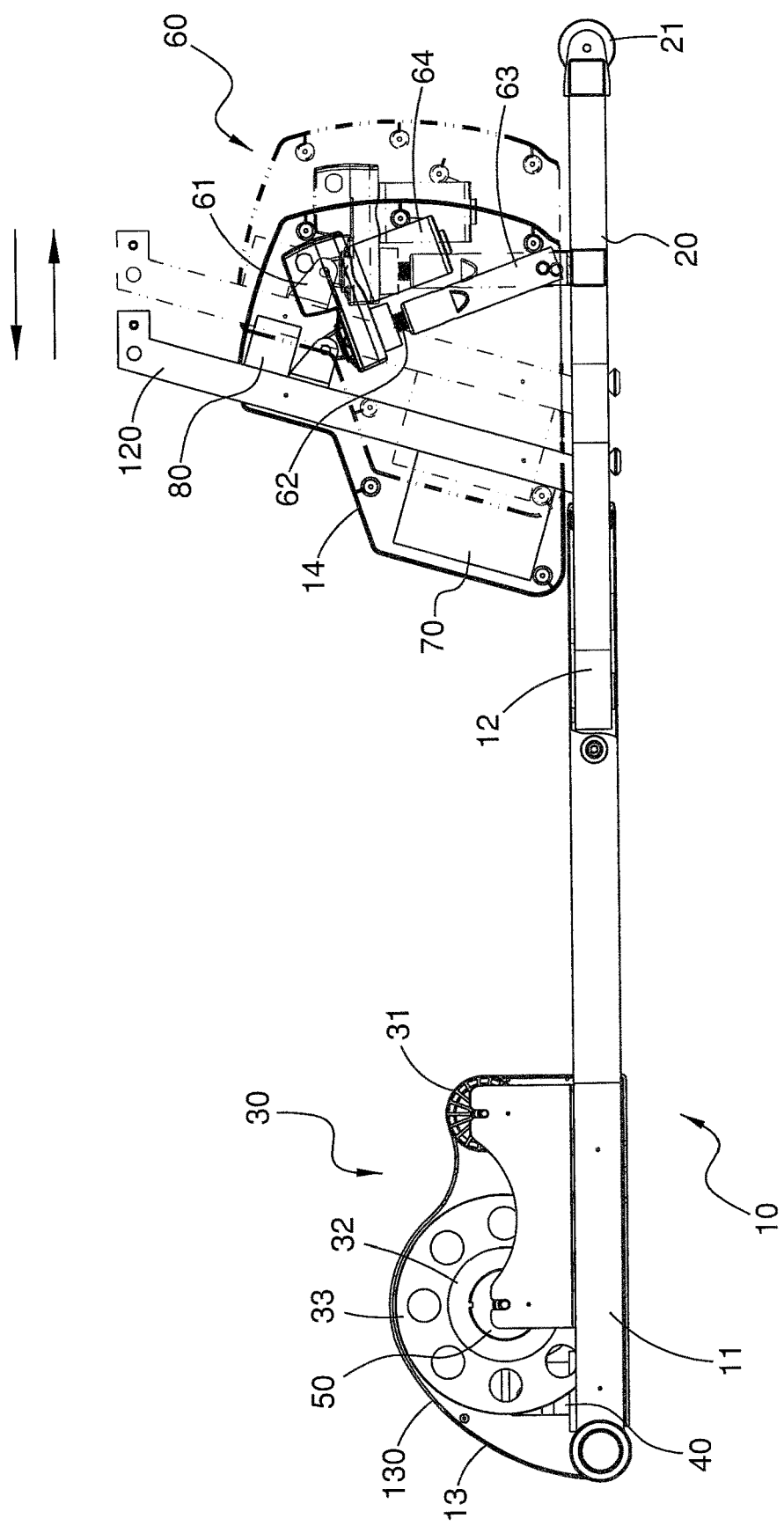
FIG. 4 is a schematic view showing a dimension adjusting operation of the present invention.

Referring to FIGS. 2 and 4, adjusting the retractable position of the front fork holder 12 at the front end of the base 11 makes the applications to various sizes of bicycles A become possible.

Figure 5:
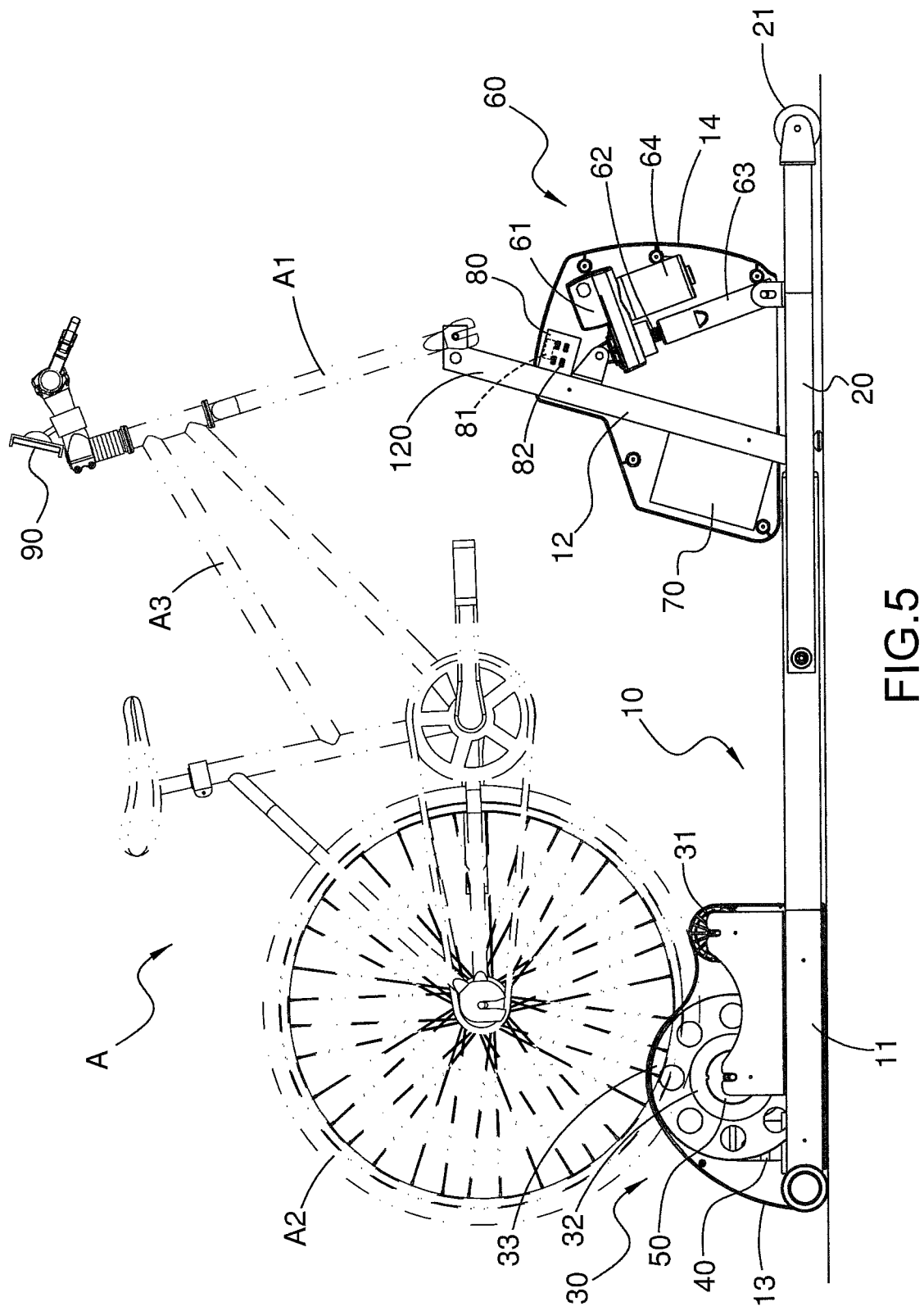
FIG. 5 is a schematic view showing a used state of the present invention when a smooth road is simulated.
Figure 6:
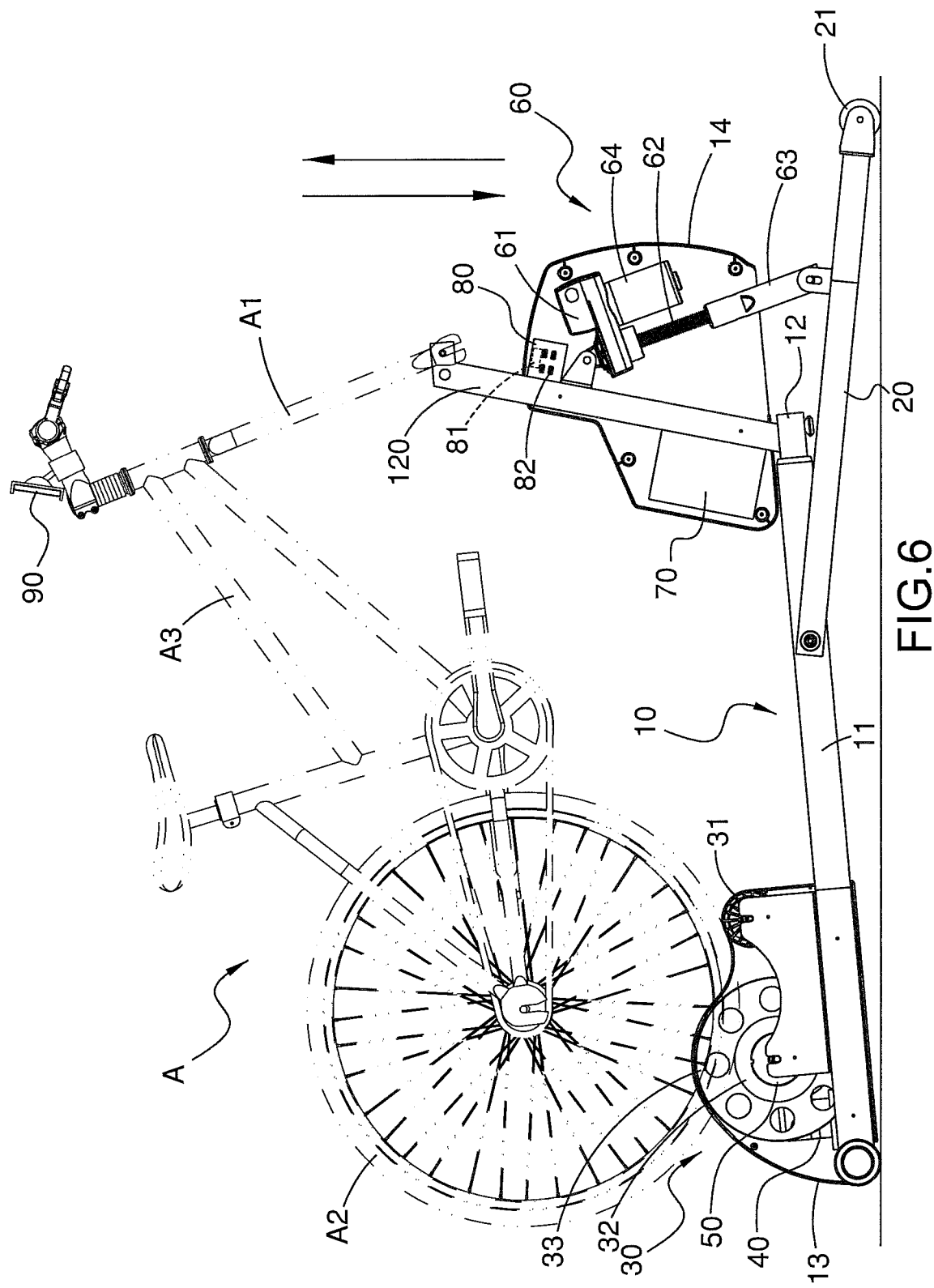
FIG. 6 is a schematic view showing a used state of the present invention when an uphill or bumpy road is simulated.

Referring to FIGS. 2 and 5 to 6, the lifting device 60 includes a seat base 61, a screw rod 62, a sleeve 63 and a driver 64. The seat base 61 is swingably combined with the fixing rod 120 of the front fork holder 12. A top end of the screw rod 62 is rotatably combined with the seat base 61. A bottom end of the sleeve 63 is swingably combined with the support frame 20, and a bottom end of the screw rod 62 is screwed to a top end of the sleeve 63. The driver 64 is disposed on the seat base 61 and includes a servo motor for driving the screw rod 62 to rotate clockwise or counterclockwise. The screw rod 62 is retractable on one end of the sleeve 63 by rotating clockwise or counterclockwise, and thus can drive the front end of the base seat 10 up or down through the support frame 20.

Referring to FIGS. 1, 2 and 4, the controller 80 includes a wireless signal transceiver module 81 and a plurality of connection units 82. The wireless signal transceiver module 81 may include a bluetooth module and an infrared module through which the wireless connections with the display device 90 and the operation device 91 are established. The connection units 82 may be electrically connected to a plurality of power lines by way of inserting and supply the electric power to a plurality of electronic devices 92. Of course, the plurality of connection units 82 may also be electrically connected to a plurality of wires by way of inserting and respectively connected to the display device 90 and the operation device 91 to supply the electric power to the display device 90 and the operation device 91, so that the display device 90 and the operation device 91 can control the controller 80. In the present invention, the connection unit 82 may be a power and signal transmission connector, such as a USB connector or the like.

In the bicycle trainer of the present invention, the magnetic control damping device 40 controls the rear roller 32 to generate the resisting force to simulate the stamp strengths required by the bicycle A on the uphill, smooth or other roads, and then the lifting device 60 controls the support frame 20 to drive the front end of the base seat 10 up or down to dynamically simulate the state of the body A3 of the bicycle A running on the uphill, smooth or bumpy road. Thus, the objective of dynamically simulating the actual state of the bicycle running on the uphill, smooth or bumpy road can be achieved, and the actual requirement of the bicycle rider can be satisfied to enhance the training effectiveness. More particularly, it is possible to synchronously control the magnetic control damping device 40 and the lifting device 60 to perform the corresponding traffic condition simulating and driving in correspondence with the situation displayed on the display device 90, so that the bicycle training further has the telepresence, and the training interest and effect can be significantly enhanced. More particularly, the power generation device 50 converts the rotating power, generated upon training, into the electric power for the dynamic simulation or other electronic devices 92, so that the effective energy saving effect can be achieved.

New characteristics and advantages of the invention covered by this document have been set forth in the foregoing description. It is to be expressly understood, however, that the drawings are for the purpose of illustration only and are not intended as a definition of the limits of the invention. Changes in methods, shapes, structures or devices may be made in details without exceeding the scope of the invention by those who are skilled in the art. The scope of the invention is, of course, defined in the language in which the appended claims are expressed.

What is claimed is:

1. A bicycle trainer, comprising:
a base seat comprising a base and a front fork holder disposed on a front end of the base seat, wherein the front fork holder has a fixing rod with a top end portion onto which a front fork of a bicycle is mounted;
a support frame having one end swingably combined with a front end of the base, and the other end having a plurality of rollers;
a roller set comprising a front roller and a rear roller parallelly and separately disposed on the base, wherein a rear wheel of the bicycle rests against top sides of the front and rear rollers;
a magnetic control damping device, which is disposed on the base and generates a magnetic drag force to control a damping effect of the rear roller;
a power generation device, which is disposed in the rear roller, and converts a rotating power of the rear roller into an electric power;
a lifting device, which is connected to the front fork holder and the support frame, and controls the support frame to drive the front end of the base seat up or down;
a rechargeable battery storing and supplying the electric power; and
a controller, which is connected to the rechargeable battery, the lifting device, the power generation device and the magnetic control damping device, supplies the electric power, generated by the power generation device, to the lifting device and the magnetic control damping device, stores excess electric power into the rechargeable battery, controls a magnitude of the magnetic drag force generated by the magnetic control damping device, and controls the lifting device to drive the support frame to move the front end of the base seat up or down by a height.

2. The bicycle trainer according to claim 1, wherein the front fork holder is retractably and adjustably combined with the front end of the base.

3. The bicycle trainer according to claim 1, wherein one end of the rear roller is combined with a flywheel with a larger outer diameter.

4. The bicycle trainer according to claim 1, wherein the base seat comprises a rear housing and a front housing, the rear housing is disposed on a rear portion of the base and covers the roller set and the magnetic control damping device, the rear housing is formed with an opening for exposing top side portions of the front roller and the rear roller, the front housing is disposed on the front fork holder, the top end portion of the fixing rod extends out of the front housing, and the front housing covers the lifting device, the rechargeable battery and the controller.

5. The bicycle trainer according to claim 1, wherein the lifting device comprises a seat base, a screw rod, a sleeve and a driver, the seat base is swingably combined with the fixing rod of the front fork holder, a top end of the screw rod is rotatably combined with the seat base, a bottom end of the sleeve is swingably combined with the support frame and a bottom end of the screw rod is screwed to a top end of the sleeve, the driver disposed on the seat base drives the screw rod to rotate clockwise or counterclockwise so that the screw rod is retractable on one end of the sleeve.

6. The bicycle trainer according to claim 1, wherein the controller comprises a plurality of connection units to be electrically connected to a plurality of power lines by way of inserting and connected to a plurality of electronic devices, wherein the connection units supply the electric power to the electronic devices.

7. The bicycle trainer according to claim 1, further comprising a display device, which is connected to the controller in a wired or wireless manner, and displays images when the bicycle runs on various roads, wherein different signals are generated and transmitted to the controller in correspondence with the images, so that the controller controls the lifting device and the magnetic control damping device according to the images to dynamically simulate situations when the bicycle runs on the various roads.

8. The bicycle trainer according to claim 7, wherein the display device is one of a mobile phone, a tablet computer or a monitor.

9. The bicycle trainer according to claim 7, wherein the controller comprises a wireless signal transceiver module and a plurality of connection units, wherein the wireless signal transceiver module is connected to the display device in a wireless manner, wherein the connection units are respectively electrically connected to power lines by way of inserting and connected to a plurality of electronic devices and supply the electric power to the electronic devices, or are electrically connected to a wire by way of inserting and connected to the display device to supply the electric power to the display device, so that the display device controls the controller.

10. The bicycle trainer according to claim 9, wherein the wireless signal transceiver module comprises a bluetooth module.

11. The bicycle trainer according to claim 1, further comprising an operation device connected to the controller in a wired or wireless manner to manually control the magnetic control damping device and the lifting device through the controller.

12. The bicycle trainer according to claim 11, wherein the operation device is a wireless remote controller or a wired operator.

13. The bicycle trainer according to claim 11, wherein the controller comprises a wireless signal transceiver module and a plurality of connection units, wherein the wireless signal transceiver module is connected to the operation device in a wireless manner, wherein the connection units are electrically connected to power lines by way of inserting and supply the electric power to electronic devices, or are electrically connected to a wire and connected to the operation device to supply the electric power to the operation device and so that the operation device controls the controller.

14. The bicycle trainer according to claim 13, wherein the wireless signal transceiver module comprises an infrared module.

* * * * *